United States Patent [19]

Eagon

[11] Patent Number: 5,022,684
[45] Date of Patent: Jun. 11, 1991

[54] BNB CLAMP

[76] Inventor: James F. Eagon, 19802 Mero Rd., Snohomish, Wash. 98290

[21] Appl. No.: 516,684

[22] Filed: Apr. 30, 1990

[51] Int. Cl.⁵ ............................................. F16L 25/00
[52] U.S. Cl. ........................................ 285/12; 285/15; 285/179; 285/373; 285/387
[58] Field of Search ....................... 285/12, 15, 16, 17, 285/373, 179, 387

[56] References Cited

U.S. PATENT DOCUMENTS

| | | | |
|---|---|---|---|
| 2,366,341 | 1/1945 | Lappin . | |
| 3,517,701 | 6/1970 | Smith | 285/15 |
| 3,689,110 | 9/1972 | Ferguson | 285/15 |
| 3,944,260 | 3/1976 | Petroczky | 285/15 |
| 4,461,498 | 7/1984 | Kunsman | 285/16 |
| 4,576,401 | 3/1986 | Harrison . | |
| 4,653,782 | 3/1987 | Mundoy . | |
| 4,721,330 | 1/1988 | Woodhouse . | |
| 4,728,130 | 3/1988 | Corzine . | |
| 4,768,813 | 9/1988 | Timmons . | |
| 4,822,075 | 4/1989 | Reaux . | |

FOREIGN PATENT DOCUMENTS

| | | | |
|---|---|---|---|
| 2716894 | 10/1978 | Fed. Rep. of Germany | 285/179 |
| 1598435 | 9/1981 | United Kingdom | 265/15 |

Primary Examiner—Dave W. Arola
Attorney, Agent, or Firm—H. Albert Richardson

[57] ABSTRACT

A clamp for sealing leaks occurring between a pipe and a pipe fitting. The clamp is usable with common tee, straight, reducer, and 90° elbow fittings and with various combinations of simple adapters can be used with at least two standard sizes of any such fittings. Two of the disclosed embodiments are particularly useful with flanged gate valves.

10 Claims, 6 Drawing Sheets

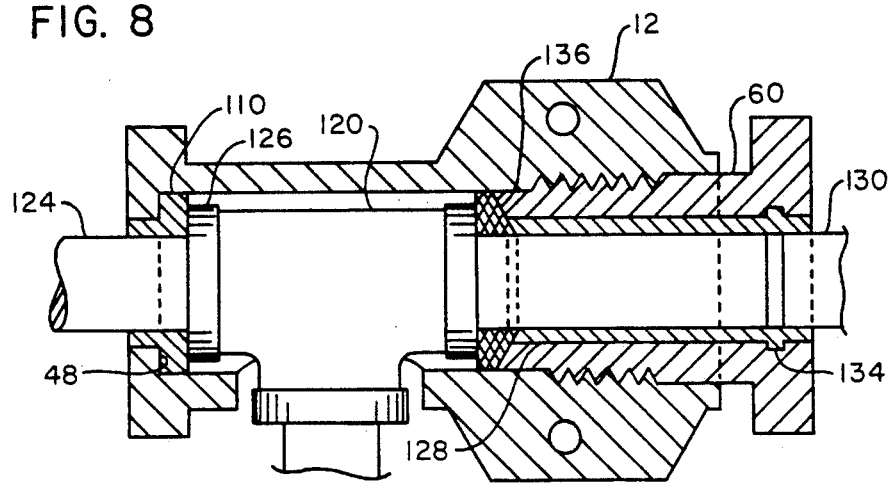
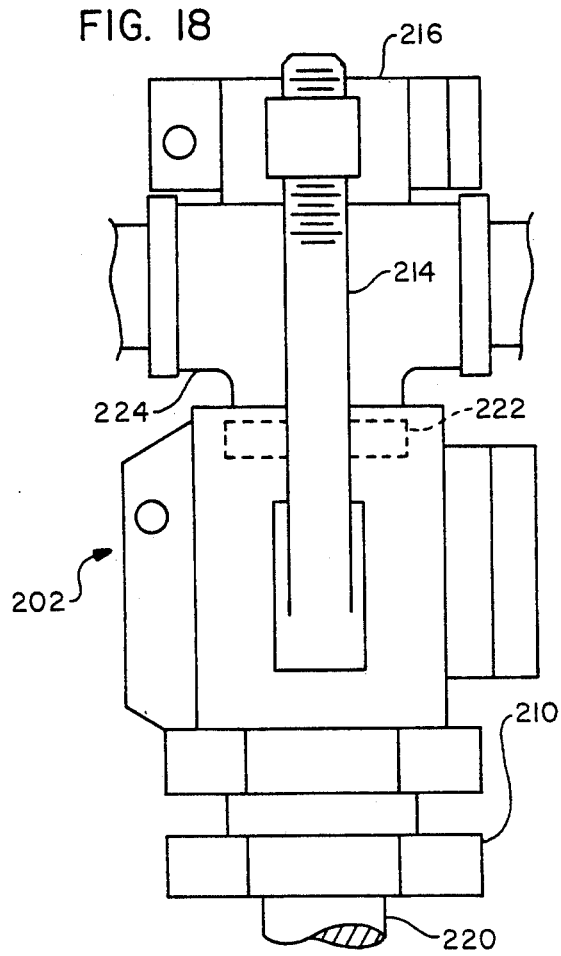
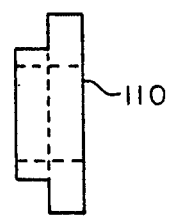
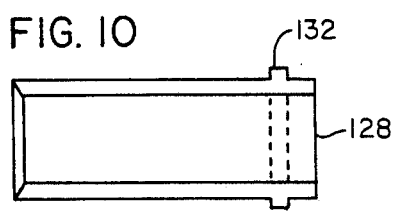
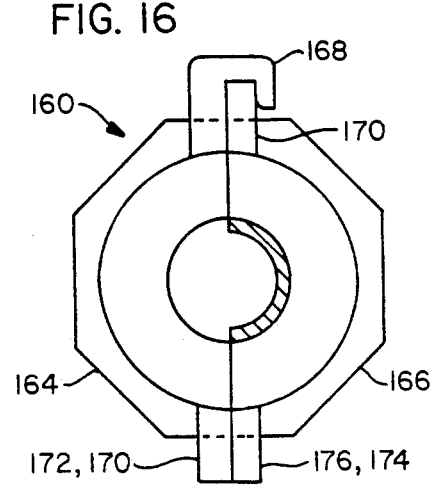

FIG. 11
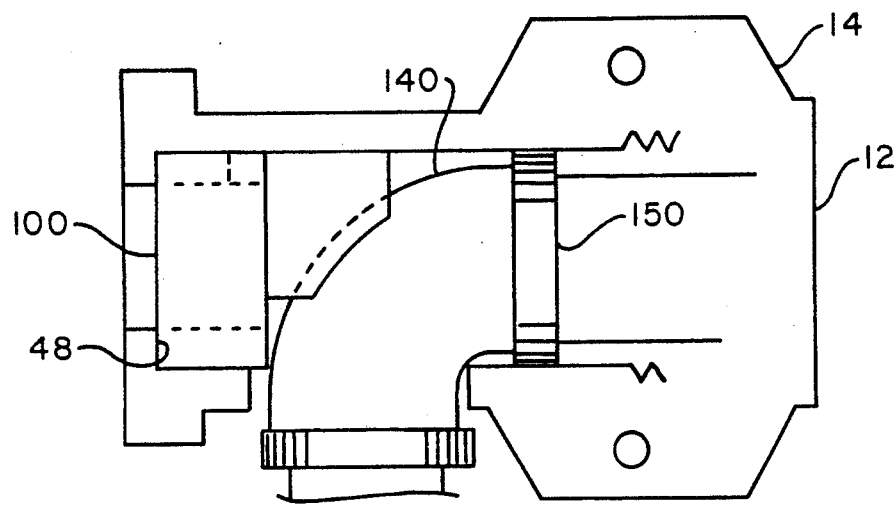
FIG. 12
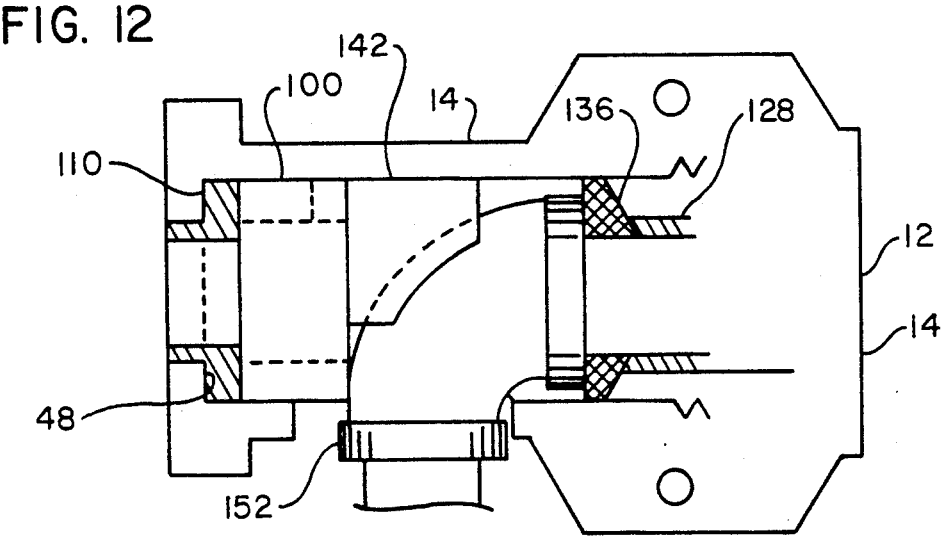
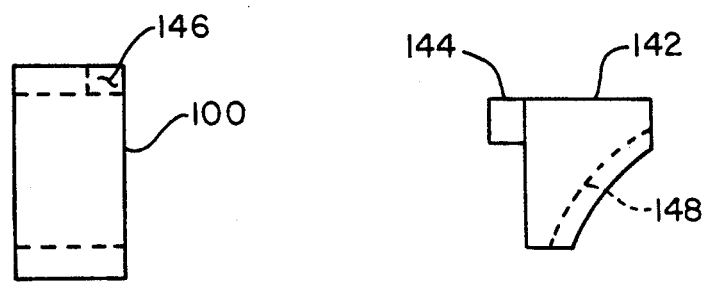
FIG. 13    FIG. 14

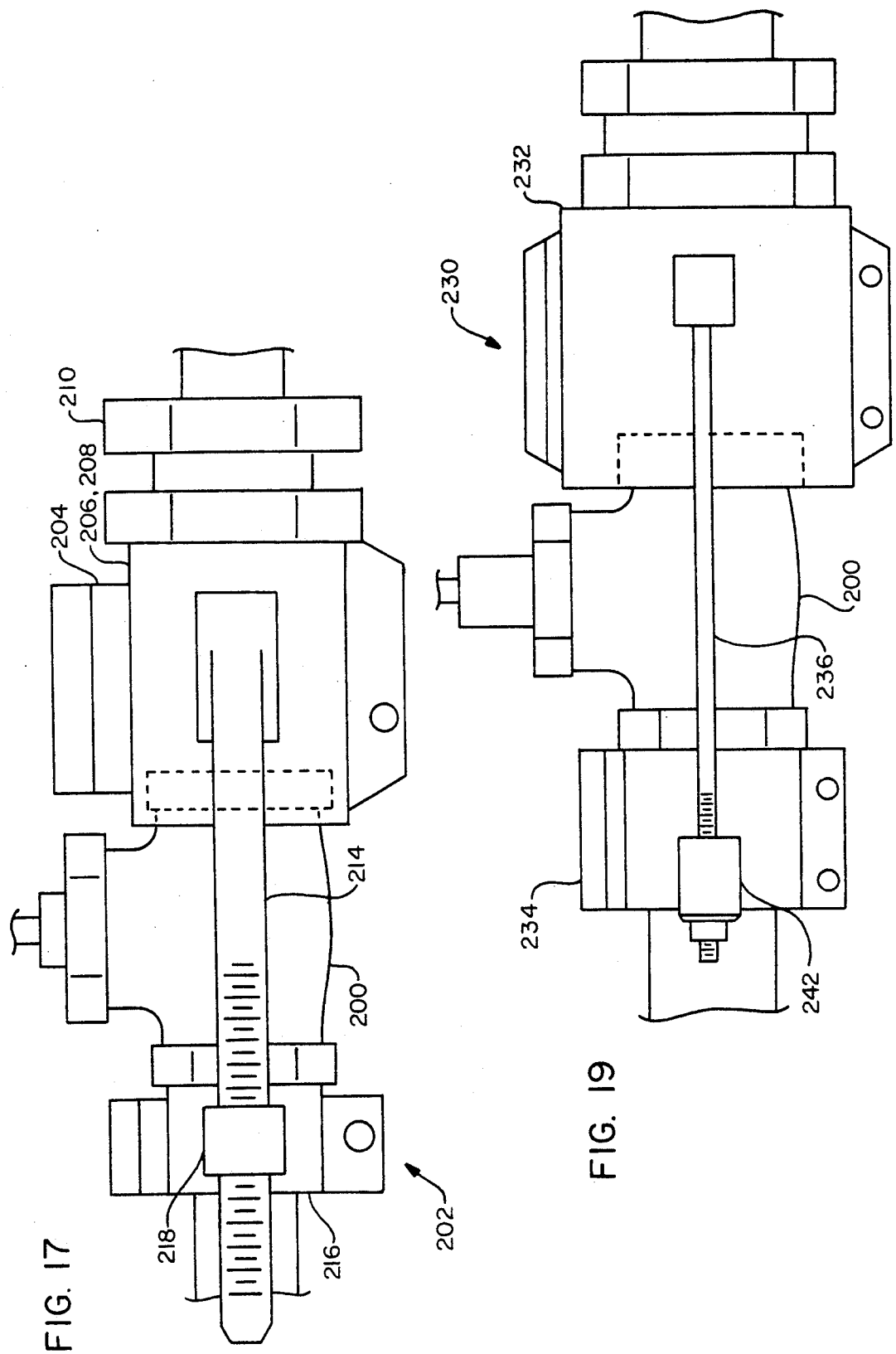

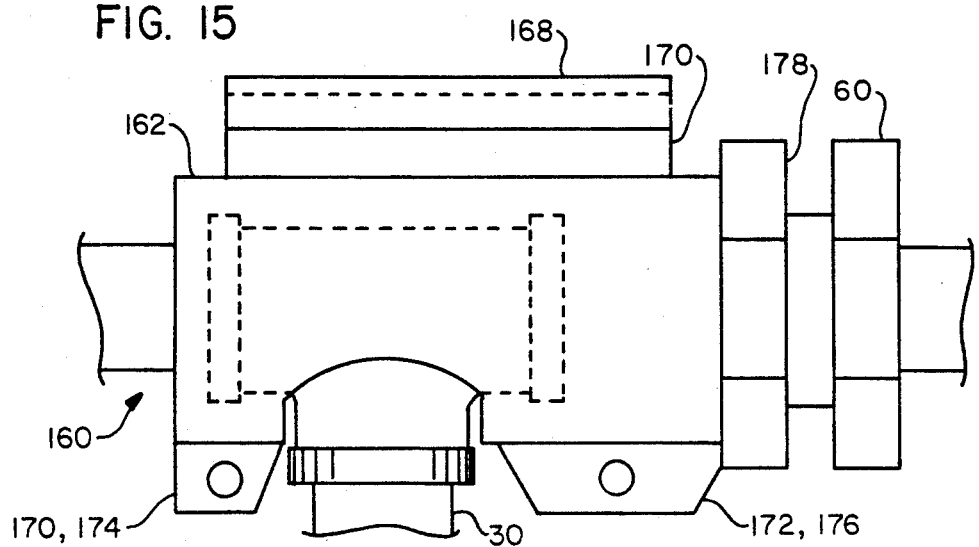
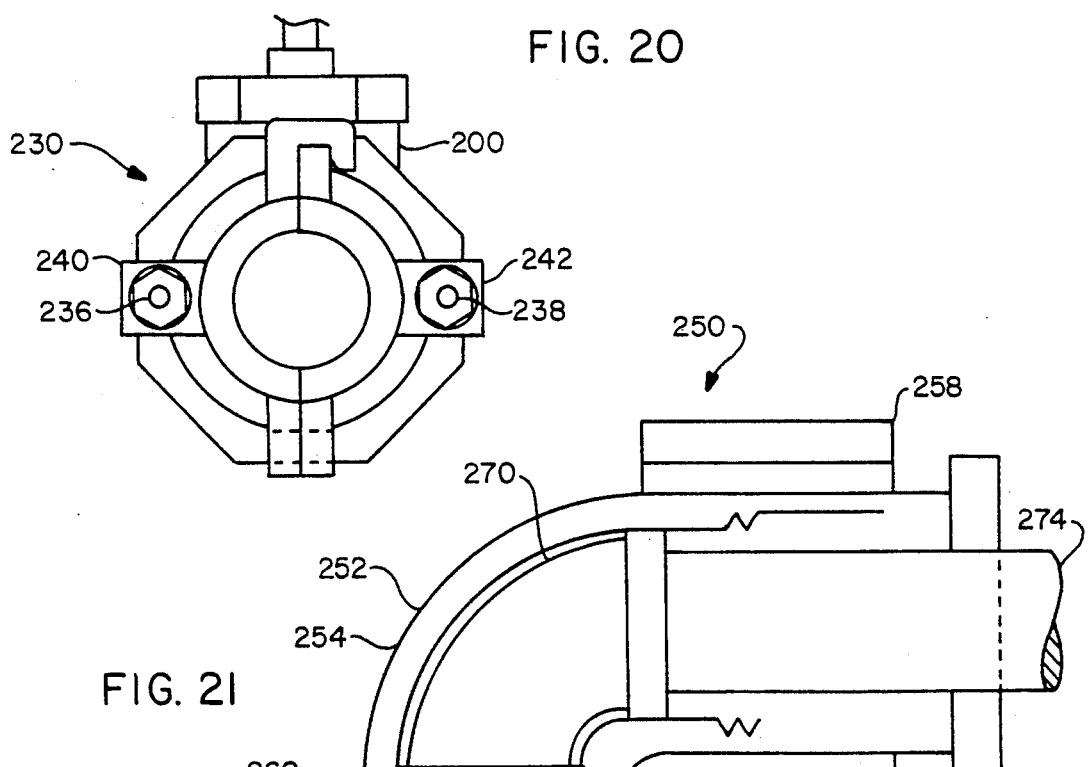
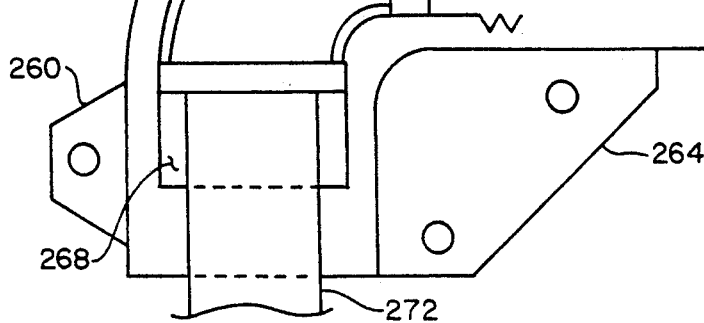

BNB CLAMP

BACKGROUND OF THE INVENTION

This invention generally relates to plumbing devices and more particularly to a clamp for sealing leaks occurring between a pipe and a pipe fitting.

One of the most common ways to join galvanized iron plumbing pipes is to cut external threads on adjacent ends of the two pipes to be joined and insert each threaded end into opposing internally threaded entrances of an appropriately sized pipe fitting. Such fittings are commonly available in straight, tee, and 90° elbow versions and each of those versions is available in various sizes adapted to receive common sizes of pipe. Reducer fittings are also available to join two different sizes of pipe.

One of the problems encountered with such joints is that over a period of time, stress induced cracks tend to occur in the treaded portions of the pipes at the point where they enter the fitting, resulting in leakage. Previously, proper repair of such leaks often required removal and replacement of a section of the pipe including the damaged end. Such a process could be time consuming and expensive and would require shutting off of water in the pipe until the repair was completed.

Various types of clamps are currently available for repairing a leak emanating from a small rupture in a pipe in a location remote from fittings. Typically such clamps include a longitudinally split cylindrical body adapted to encircle the pipe, packing for providing a seal between the body halves and between the body and the pipe, and means for clamping the halves together. While such devices might be adapted for use with straight fittings, they could not be made to function with tee or elbow fittings.

Accordingly, it is a principal object of this invention to provide for a pipe clamp for sealing leaks in a pipe at or near its junction with a fitting between a pipe and a pipe fitting which can be used with straight tee or elbow fittings.

It is also an object of this invention to provide for a pipe clamp for sealing such leaks which is relatively inexpensive, which can be installed quickly and which does not require the shutting off of water into the damaged pipe for installation.

It is a further object of this invention to provide such a pipe clamp which can be used with at least two common pipe and pipe fitting sizes.

SUMMARY OF THE INVENTION

This invention can be broadly summarized as providing for a clamp for sealing leaks occurring in a pipe at or near its junction with a flanged pipe fitting or other plumbing devices including having such a flange fitting. The clamp includes a split longitudinally body having a cavity adapted to at least partially enclose the pipe fitting. The clamp also includes means for joining the two body portions, means connected to the body for retaining the fitting, packing means, and a longitudinally split bolt. The bolt is threaded to engage a threaded portion of the body cavity.

More detailed aspects of the invention include a spacer permitting use of the invention with a straight fitting and a body insert which adapts the clamp for use with a reducer fitting and smaller diameter pipes. Another detailed aspect includes a bolt insert permitting use of the clamp with smaller sizes of fittings. Yet another detailed aspect includes a backer which adapts the clamp for use with a 90° elbow fitting.

In accordance with another embodiment of the invention, the retaining means includes a collar adapted to engage the fitting and at least one bolt adjustably connecting the collar to the body. In yet another embodiment intended for use with a 90° elbow fitting, the cavity in the body has an arcuate shaped and adapted to totally enclose the fitting.

BRIEF DESCRIPTION OF THE DRAWINGS

FIG. 8 is a sectional view of the embodiment of FIG. 1 including a bolt insert.

FIG. 9 shows a body insert usable in certain applications of the embodiment of FIG. 1.

FIG. 10 illustrates a bolt insert shown in FIG. 8.

FIGS. 11 and 12 are sectional views of the body of the embodiment of FIG. 1 as adapted for use with elbow fitting of different sizes.

FIGS. 13 and 14 illustrate a spacer and a backer, respectively, as shown in FIGS. 11 and 12.

FIGS. 15 and 16 are side and left end views, respectively, of a second embodiment of the present invention.

FIGS. 17 and 18 are side views of a third embodiment of the present invention.

FIGS. 19 and 20 are side and left end views, respectively, of a fourth embodiment of the present invention.

FIG. 21 is a sectional view of the body of fifth embodiment of the invention usable with a 90 degree elbow fitting.

DESCRIPTION OF THE PREFERRED EMBODIMENTS

The novel features believed to be characteristic of this invention are set forth in the appended claims. The invention itself, however, may be best understood and its various objects and advantages best appreciated by reference to the detailed description below in connection with the accompanying drawings.

Figure 1:
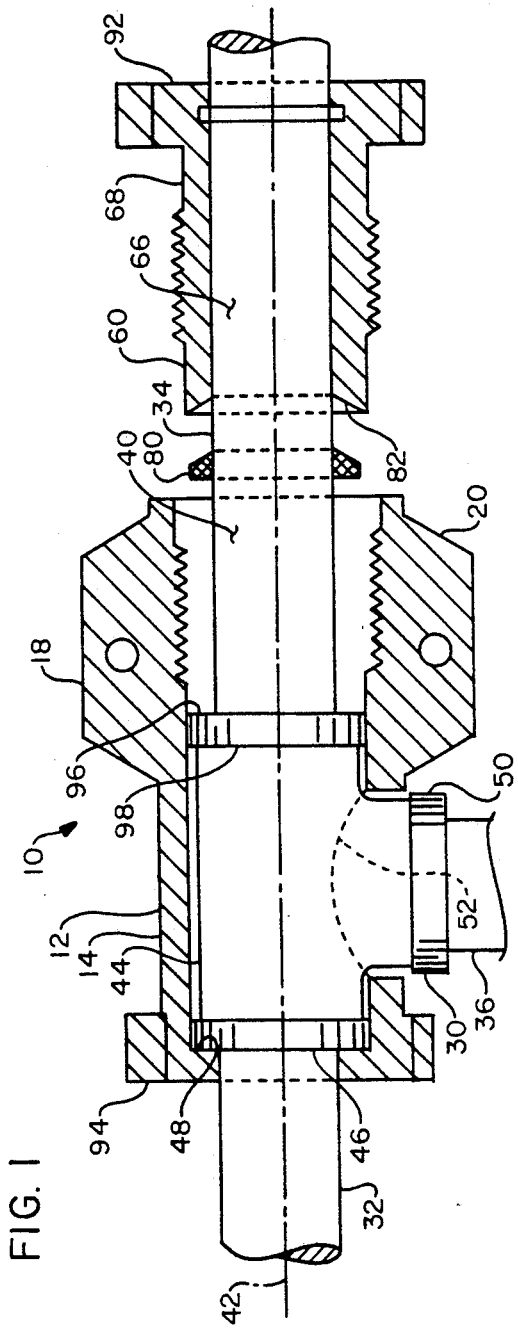
FIG. 1 is an exploded sectional view of one embodiment of the present invention taken at 1—1 in FIG. 3.
Figure 3:
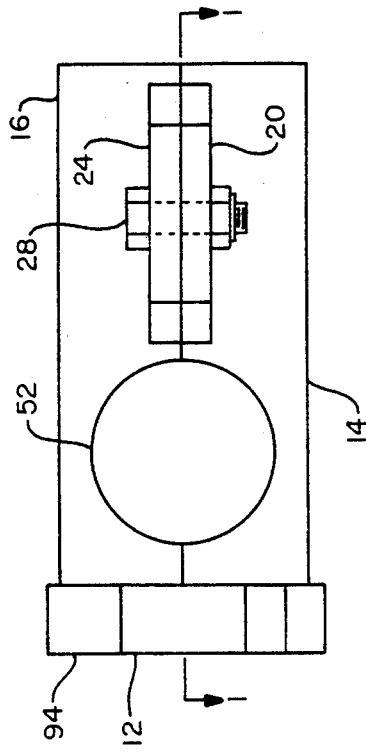
FIG. 3 is a bottom view of the body of FIG. 1.
Figure 2:
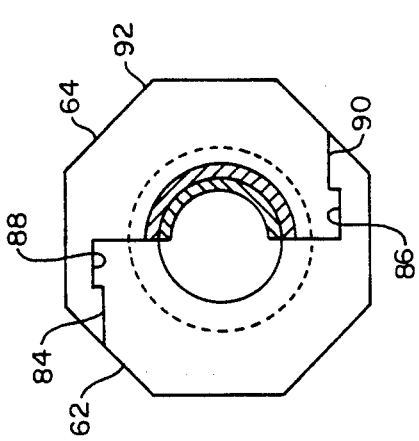
FIG. 2 is a right end view of the bolt shown in FIG. 1.
Figure 4:
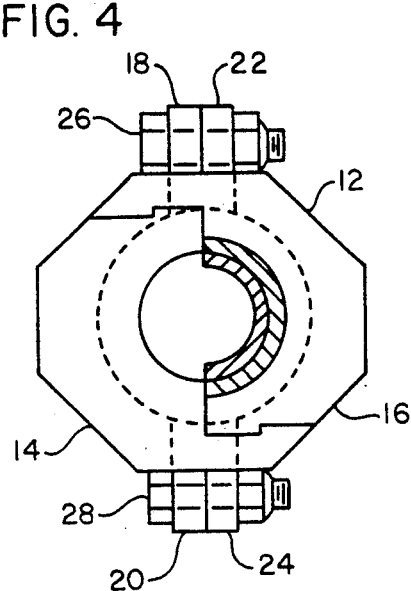
FIG. 4 is a left end view of the body of FIG. 1.

One embodiment of a pipe clamp constructed in accordance with the teachings of the present invention is illustrated in FIGS. 1 through 14 and generally designated by the number 10. Referring to FIG. 1 of that group it can be seen that the clamp includes body 12 which is longitudinally split into halves 14 and 16. Means for joining the halves include opposing flanges 18 and 20 of half 14, flanges 22 and 24 of half 16 and bolts 26 and 28, which are inserted through the mating flanges as shown in FIG. 4. The clamp is shown installed on standard three-quarter inch tee fitting 30 which joins three-quarter inch galvanized pipes 32, 34 and 36. In this instance the clamp would be employed to seal a leak occurring at the junction of pipe 34 and the tee.

The body also includes a generally cylindrical cavity 40 which is longitudinally oriented with respect to the body (i.e., along center line 42) and shaped so as to substantially enclose upper portion 44 of the tee. When the clamp is properly positioned over the tee flange 46 abuts annular shoulder 48 of the body, which restricts movement of the tee to the left and branch leg 50 extends downward through aperture 52 which opens into cavity 40.

Figure 7:
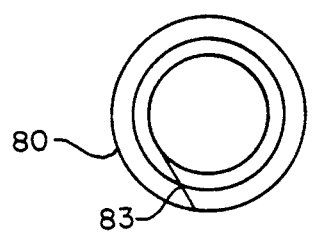
FIG. 7 illustrates the packing of the embodiment of FIG. 1.

The right hand end of cavity 40 is internally threaded to receive longitudinally split bolt 60 which includes interlocking section 62 and 64. The bolt has a longitudinally oriented cylindrical recess 66 which is slightly larger in diameter than the external diameter of the largest nominal size pipe which the clamp is intended to accommodate. Shank 68 of the bolt is threaded as shown to engage the threads formed in cavity 40. The clamp also includes packing 80 which is adapted to seat against tapered surface 82 formed in the end of the bolt. In order that the packing can be placed about pipe 34 it is slit along line 83 as shown in FIG. 7. For the convenience of the user surfaces 84 and 86 of bolt half 62 are designed to interlock with mating surfaces 88 and 90 of bolt half 64, but the inventor regards this feature as optional.

In operation, when a leak is discovered at the junction of pipe 34 and tee 30 the clamp is installed by first assembling body halves 14 and 16 over the tee with bolts 26 and 28. Next, packing 80 is placed on pipe 34 shown in FIG. 1 and bolt 60 is positioned around the pipe by snapping halves 62 and 64 together. Then, the bolt together with the packing are slid to the left until the threads of the bolt and body engage. Thereafter, the bolt and the packing are advanced toward the tee by rotating the bolt with a wrench applied to the flats of bolt head 92 while holding the body with a wrench on the flats of head 94. Finally, as the tightening of the bolt continues, packing 80 is compressed between surface 96 of flange 98 and seating surface 82 of the bolt and expands radially in the cavity so as to seal the leak.

Figure 5:
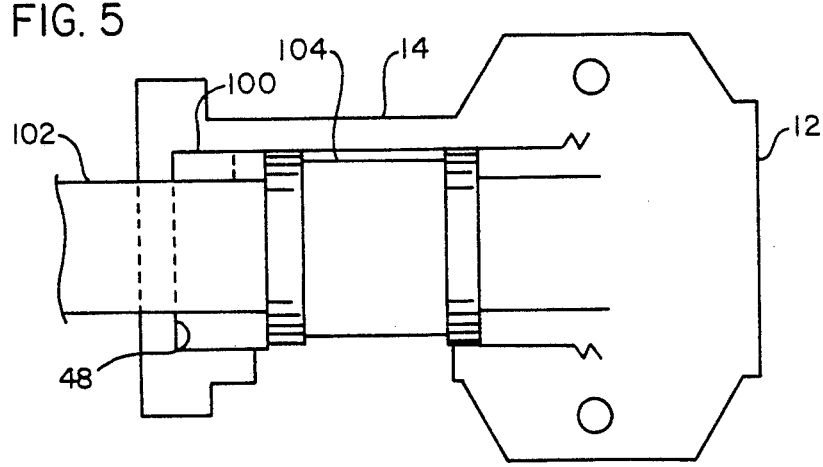
FIG. 5 shows the embodiment of FIG. 1 as used with a straight fitting.
Figure 6:
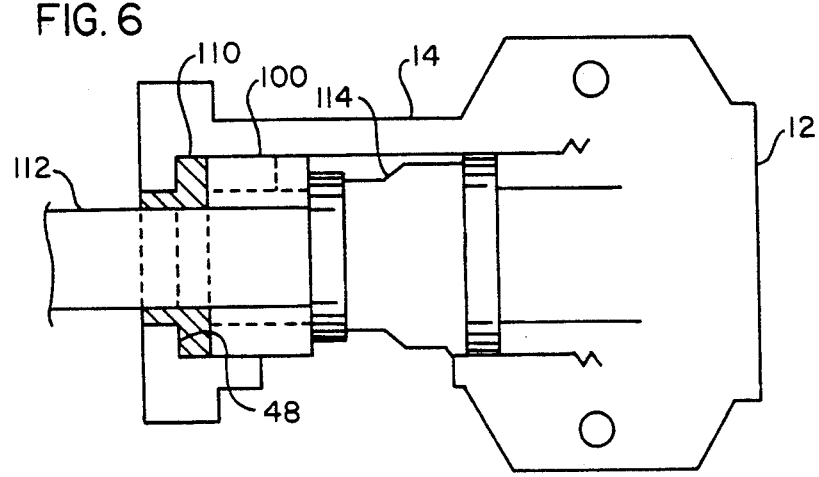
FIG. 6 shows the embodiment of FIG. 1 as used with a reducer fitting.

An important aspect of this invention is that it can be easily adapted for use with fittings of different configurations and at least two different sizes, thus significantly reducing the number of different sized clamps that would have to be stocked by a plumber or plumbing supplier. For example, FIG. 5 illustrates how the clamp of FIG. 1 can be used with a three-quarter inch straight fitting by placing split spacer 100 about pipe 102 and against fitting 104 before assembling the clamp body. Similarly, FIG. 6 illustrates the way in which the clamp can be used with a three-quarter inch to one-half inch reducer fitting. In this configuration spacer 100 and split body insert are both placed about one-half inch pipe 112 prior to assembly of body 12 about reducer fitting 114.

FIG. 8 illustrates how the clamp may be modified for use with a standard one-half inch tee fitting, such as fitting 120. In order to accommodate the smaller diameter pipe the body insert 110 is placed about one-half pipe 124 adjacent flange 126 of the fitting. Split bolt insert 128 is placed about one-half inch pipe 130 and then bolt halves 62 and 64 are assembled about the insert with annular ridge 132 of the insert seated in annular groove 134 of the bolt. Packing 136 is similar in configuration to packing 80 except that it has a smaller inside diameter to accommodate the smaller diameter pipe.

Use of the clamp with a 90° elbow fittings is illustrated in FIGS. 11 and 12. For example, three-quarter inch fitting 140 is accommodated by first positioning backer 142 against spacer 100 as shown in FIG. 11 with tab 144 installed in slot 146 of the spacer. Next, these two parts are positioned against the elbow as shown with arcuate surface 148 of the backer resting against the elbow. Finally, body half 14 is positioned over the spacer, backer and elbow and the body is completed by fastening body halves 14 and 16 together. It can be seen that as bolt 60 compresses packing 80 against flange 150, the fitting will be held firmly in position by the backer and spacer and compressive load from the bolt will be transmitted through them to the body. As shown in FIG. 12, use of the clamp with one-half inch elbow 152 requires, in addition to the backer and spacer, body insert 110, bolt insert 128 and packing 136.

Accordingly, from the above examples it can be seen that the clamp built in accordance with the teachings of the present invention is usable with tee straight reducer and 90° elbow fittings of any given standard size and moreover, that it can be easily and quickly modified for use with the next nearest standard size of such fittings.

A second embodiment of the present invention is illustrated FIGS. 15 and 16 and generally designated by the numeral 160. The principal difference between this embodiment and the embodiment of FIG. 1 is in the means for joining the body halves. Referring to those figures it can be seen that body 162 having body halves 164 and 166. Means for joining the halves includes flange 168 which is formed to engage flange 170 of half 166. The means for joining also includes flanges 170 and 172 of half 164, which may be bolted ti flanges 174 and 176 of half 166, respectively. It is believed that this configuration may offer some advantages during assembly of the body. Another difference between this embodiment and that of FIG. 1 is that body head 178, which corresponds to head 94 of FIG. 1, has been repositioned on the body so as to be in closer proximity to bolt 60. It is believed that this modification makes it easier to tighten bolt 60.

FIGS. 17 and 18 illustrate a third embodiment of the present invention which is particularly intended for use with gate valves such as gate valve 200. Due to the size and configuration of the bodies of such valves, neither of the two embodiments described above can be easily adapted for use with them. In this embodiment, however, the means for retaining is adjustably spaced from the clamp body and joined to it by a pair of flexible straps so as to easily accommodate various valve body configurations. Referring to 17 it can be seen that the clamp, generally designated by the number 202, includes clamp body 204 having body havles 206 and 208. The retaining means includes a pair of straps 212 and 214 (not shown) which are secured to opposing sides of body 204 preferably by an adhesive. The straps extend around opposing sides of valve 200 and are adjustably attached to split collar 216 by buckles 218 and 219 (not shown). Both the collar and the body halves are preferably joined by means similar to those of the second embodiment shown in FIG. 15 and other components of the embodiment are similar to those of the first two embodiments.

FIG. 18 illustrates the use of the clamp of FIG. 17 used to seal a leak at the intersection of pipe 220 and lower flange 222 of tee fitting 224. This embodiment permits collar 216 to be positioned atop the fitting as shown and the clamp body to be assembled about flange 222 below. FIGS. 19 and 20 illustrate a fourth embodiment of the present invention, generally designated by the number 230, which is a modified version of clamp 202. Principally, this version involves the substitution of a pair of elongated bolts to adjustably join the clamp body and the collar. Referring to those figures it can be seen that this embodiment includes body 232 which is adjustably joined to collar 234 by bolts 236 and 238. The bolts are secured to opposing sides of the body as shown, extend around opposing sides of valve 200, pass through bosses 240 and 242, respectively, and are secured to the collar by nuts.

Finally, a fifth embodiment of the present invention is shown in FIG. 21. This particular embodiment is specifically intended for use with 90° elbow fittings and is intended to provide greater support for the pipes entering the fitting than the clamp arrangement shown in FIGS. 11 and 12. This embodiment, generally designated by the number 250, includes body 252 having body halves 254 and 256 (not shown). Means for joining the body halves includes a flange projecting upward from body half 256 and a cooperating flange 258 which is similar to clamp 168. It also includes mating flanges 260 and 262 (not shown), and mating gussets 264 and 266 (not shown). The gussets provide added reinforcement and rigidity to the body. The body also includes recess 268 which is adapted to enclose 90° fitting 270 and adjoining portions of pipes 272 and 274. By employing body and bolt inserts similar to those disclosed above the clamp can be easily adapted for use with a smaller elbow.

Thus it can be seen that the present invention provides for an improved pipe clamp for sealing leaks which incorporates many novel features and offers significant advantages over the prior art. Although only five embodiments of this invention have been illustrated and described, it is to be understood that obvious modifications can be made of it without departing from the true scope and spirit of the invention.

I claim:

1. A clamp for sealing leaks occurring between a pipe and a flanged tee pipe fitting having a branch leg or the like comprising: a body longitudinally divided into two portions and having a cavity adapted to at least partially enclose the pipe fitting, the cavity including opposing entrances, an aperture intermediate the entrances adapted to permit extension of the branch leg therethrough an internally threaded section;

means for joining the two body portions about the fitting;

means connected to the body for retaining the fitting;

packing means; and a bolt longitudinally divided into two portions and adapted to engage the threaded section of the cavity for compressing the packing means against the flange.

2. The clamp of claim 1 wherein the means for joining includes mating flanges extending from the body portions and means for fastening the flanges together.

3. The clamp of claim 1 wherein the means for joining further includes a first flange extending from one of said body portions and a second flange extending from the other body portion and having a lip extending over the first flange.

4. The clamp of claim 1 wherein the means for retaining includes an annular shoulder extending into the cavity and adapted to engage a flange of the fitting.

5. The clamp of claim 1 wherein the means for retaining includes a collar adapted to engage a flange of the fitting and means for adjustably connecting the collar to the body.

6. The clamp of claim 5 wherein the means for connecting is a strap and a buckle.

7. The clamp of claim 5 wherein the means for connecting is a bolt and a nut.

8. The clamp of claim 1 wherein the bolt includes means attached to each bolt portion for interlocking the portions.

9. The clamp of claim 1 including means for adapting the clamp for use with a 90° elbow fitting, the means including a spacer having a arcuate surface adapted to engage the elbow fitting.

10. A clamp for sealing leaks occurring between a pipe and a flanged tee pipe fitting having a branch leg or the like comprising:

a body longitudinally divided into two portions and including a cavity adapted to at least partially enclose the pipe fitting, the cavity having opposing entrances, an aperture intermediate the entrances adapted to permit extension of the branch leg therethrough and an internally threaded section;

means for joining the two body portions about the fitting including mating flanges extending from the body portions and a fastener for securing the flanges together;

means connected to the body for retaining the fitting including an annular shoulder adapted to engage a flange of the fitting;

packing means; and, a longitudinally divided bolt adapted to engage the threaded section of the cavity for compressing the packing against a flange.

* * * * *